United States Patent
Kuwata

(10) Patent No.: US 8,203,243 B2
(45) Date of Patent: Jun. 19, 2012

(54) ELECTROMAGNETIC ATTRACTION TYPE MAGNETIC BEARING AND CONTROL METHOD THEREOF

(75) Inventor: Gen Kuwata, Tokyo (JP)

(73) Assignee: IHI Corporation, Tokyo (JP)

( * ) Notice: Subject to any disclaimer, the term of this patent is extended or adjusted under 35 U.S.C. 154(b) by 326 days.

(21) Appl. No.: 12/593,738

(22) PCT Filed: Feb. 7, 2008

(86) PCT No.: PCT/JP2008/052051
§ 371 (c)(1),
(2), (4) Date: Sep. 29, 2009

(87) PCT Pub. No.: WO2008/126462
PCT Pub. Date: Oct. 23, 2008

(65) Prior Publication Data
US 2010/0133936 A1    Jun. 3, 2010

(30) Foreign Application Priority Data
Mar. 30, 2007    (JP) .................................. 2007-090408

(51) Int. Cl.
*H02K 7/09*    (2006.01)
(52) U.S. Cl. ....................................................... 310/90.5
(58) Field of Classification Search ................. 310/90.5; H02K 7/09
See application file for complete search history.

(56) References Cited

U.S. PATENT DOCUMENTS

| | | | | |
|---|---|---|---|---|
| 4,629,262 A | * | 12/1986 | Hamilton | 310/90.5 |
| 6,353,273 B1 | * | 3/2002 | Heshmat et al. | 310/90.5 |
| 6,653,756 B2 | * | 11/2003 | Ueyama et al. | 310/90.5 |
| 7,348,691 B2 | * | 3/2008 | Davis et al. | 310/12.19 |
| 2007/0080594 A1 | * | 4/2007 | Gachter | 310/90.5 |

FOREIGN PATENT DOCUMENTS

| | | |
|---|---|---|
| JP | 2001-165164 | 6/2001 |
| JP | 2002-061646 | 2/2002 |
| JP | 2003-035315 | 2/2003 |
| JP | 2006-090539 | 4/2006 |

OTHER PUBLICATIONS

JPO, Machine Translation 2002-061646, http://dossier.ipdl.inpit.go.jp.*
International Search Report issued in corresponding application PCT/JP2008/052051, completed Feb. 25, 2008 and mailed Mar. 4, 2008.

* cited by examiner

*Primary Examiner* — Quyen Leung
*Assistant Examiner* — Thomas Truong
(74) *Attorney, Agent, or Firm* — Griffin & Szipl, P.C.

(57) ABSTRACT

An electromagnetic attraction type magnetic bearing includes at least a pair of electromagnets (1, 2) arranged to face each other, a float (3) arranged between the electromagnets and held at the middle position thereof, a sensor (4) for detecting the displacement of the float (3) from a balance position, and/or the speed thereof, and a controller (5) for controlling the electromagnets (1, 2). The controller (5) determines a variable Z proportional to acceleration in the control direction from the displacement and speed of the float (3), and operates to set the control current of one of the electromagnets to zero and to control only the control current of the other of the electromagnets, depending on the positive and negative values of the variable.

3 Claims, 2 Drawing Sheets

US 8,203,243 B2

ELECTROMAGNETIC ATTRACTION TYPE MAGNETIC BEARING AND CONTROL METHOD THEREOF

This is a National Phase Application in the United States of International Patent Application No. PCT/JP2008/052051 filed Feb. 7, 2008, which claims priority on Japanese Patent Application No. 090408/2007, filed Mar. 30, 2007. The entire disclosures of the above patent applications are hereby incorporated by reference.

BACKGROUND OF THE INVENTION

1. Technical Field of the Invention

The present invention relates to an electromagnetic attraction type magnetic bearing which always sets the control current of one of electromagnets which face each other to zero, and control method thereof.

2. Description of the Related Art

An electromagnetic attraction type magnetic bearing has advantages that friction or wear does not occur and lubrication is not required, by virtue of non-contact supporting, and can be utilized as bearings of a turbo compressor, an ultralow temperature rotary machine, a turbo charger, a flywheel, and the like.

As this electromagnetic attraction type magnetic bearing, the inventors of the invention has invented magnetic bearings composed only of electromagnets, and have already filed an application (Patent Documents 1 and 2).

These magnetic bearings are those in which a current is applied to a pair of electromagnets which face each other with the float therebetween by a two-input nonlinear control method in a direction in which the displacement from the center position of the float is offset, and the float is maintained at a neutral position.

The "active control electromagnetic attraction type magnetic bearing" of Patent Document 1 aims at reducing a power loss, generation of heat of the electromagnets, and resistance against a rotational motion of the float.

Therefore, in the active control electromagnetic attraction type magnetic bearing, as shown in FIG. 1, a two-input nonlinear control method is used as a control method of applying currents $i_1$ and $i_2$ to a pair of electromagnets 52 and 53 which face each other with the float 51 therebetween in a direction in which the displacement from a neutral position O of the float 51 is offset, and maintaining the float 51 at the neutral position O.

The "electromagnetic attraction type magnetic bearing and its nonlinear control method" of Patent Document 2 aims at exerting a damping force even when return to a balance point from deviation is made, thereby making it possible to shorten convergence time, and completely satisfying the asymptotically stable condition of Lyapunov which is the sufficient condition of the control method.

Therefore, as shown in FIG. 2, this device includes at least a pair of electromagnets arranged to face each other, a float 61 arranged between the electromagnets and held at the middle position thereof, a sensor 62 for detecting the displacement of the float 61 from a balance position, and/or the speed thereof, and a controller 63 for controlling the electromagnets. In a case where the float 61 returns to the balance position, a control current is supplied to both the electromagnets which face each other by the controller 63, and thereby, one electromagnet is made to act as a tension spring, and the other electromagnet is made to act as a damper.

Patent Document 1: Japanese Patent Application Laid-Open No. 2001-165164

Patent Document 2: Japanese Patent Application Laid-Open No. 2002-61646

SUMMARY OF THE INVENTION

The magnetic bearing of Patent Document 1 has a problem in that, even when return to a balance point from deviation is made, damping force cannot be generated, time is taken till convergence, and stability is not given theoretically. This problem was solved in the magnetic bearing of Patent Document 2.

However, in Patent Document 2, in a case where the float returns to the balance position, since a control current is applied to both the electromagnets which face each other, there is a problem in that the perfect zero power control of setting the control current of any one of the electromagnets which face each other to zero cannot be achieved.

That is, in the nonlinear zero power control of Patent Document 2, a current value to be controlled is determined by detecting "displacement" and "speed" from the balance point of a rotor, and carrying out case classification into four cases using two parameters. However, in two cases of the four cases, a current is applied to both magnetic pole coils which face each other, and an unnecessary current is consumed, which causes an increase in loss.

Additionally, since two parameters are determined in every (for example, every 100 μs) operation period, operation logic for real time control is complicated, the controlled amount of CPU is increased, and a highly efficient and expensive CPU needs to be used.

The invention has been invented in order to solve the aforementioned problems. That is, the object of the invention is to provide an electromagnetic attraction type magnetic bearing and its control method capable of achieving the perfect zero power control of always setting the control current of any one of electromagnets which face each other to zero, reducing the number of parameters to be determined in every operation period, simplifying operation logic, reducing the controlled amount of CPU, and reducing the need for a highly efficient and expensive CPU.

According to the invention, there is provided an electromagnetic attraction type magnetic bearing including at least a pair of electromagnets arranged to face each other, a float arranged between the electromagnets and held at the middle position thereof, a sensor for detecting a displacement of the float from a balance position, and/or the speed thereof, and a controller for controlling the electromagnets, wherein the controller determines a variable Z proportional to acceleration in the control direction based on the displacement and the speed of the float, and operates to set a control current of one the pair of the electromagnets to zero and to control only a control current of the other of the pair of the electromagnets, depending on positive and negative values of the variable Z.

According to a preferable embodiment of the invention, the pair of electromagnets is composed of a first electromagnet and a second electromagnet, and when displacement directed to the first electromagnet from the balance position of the float is defined as x, the speed of the float is defined as v=dx/dt, and γ is defined as a positive constant, the variable Z is given by the following Equation (A):

$$Z = x + \gamma v \quad (A)$$

Additionally, according to the invention, there is provided a control method of an electromagnetic attraction type magnetic bearing which holds a float arranged at a middle position between a pair of electromagnets arranged to face each other by at least the pair of electromagnets. The control method includes detecting the displacement of the float from a balance position, and/or the speed thereof, determining a variable Z proportional to acceleration in the control direction from the displacement and the speed of the float, and operating to set the control current of one the pair of the electromagnets to zero and to control only a control current of one the pair of the electromagnets, depending on positive and negative values of the variable Z.

According to a preferable embodiment of the invention, the pair of electromagnets is composed of a first electromagnet and a second electromagnet, and when displacement directed to the first electromagnet from the balance position of the float is defined as x, the speed of the float is defined as v=dx/dt, and γ is defined as a positive constant, the variable Z is given by the following Equation (A):

$$Z = x + \gamma v \quad (A)$$

Additionally, when a is defined as a positive constant, $X_0$ is defined as a magnetic gap of the balance position, and the variable Z is positive or zero, the control current of the first electromagnet is set to zero, and the control current $i_2$ of the second electromagnet is determined by the following equation (B), and when the variable Z is negative, the control current of the second electromagnet is set to zero, and the control current $i_1$ of the first electromagnet is determined by the following equation (C):

$$i_2 = a(X_0 + x)\text{SQRT}(Z/k) \quad (B)$$

$$i_1 = a(X_0 - x)\text{SQRT}(-Z/k) \quad (C)$$

According to the apparatus and method of the above-mentioned invention, the controller determines a variable Z proportional to acceleration in the control direction from the displacement x and speed v of the float, sets the control current of one electromagnet to zero and controls only the control current of the other electromagnet, depending on the positive and negative values of the variable Z. Thus, classification into four cases is not made by case classification of two parameters including "displacement" and a "speed" unlike Patent Document 2, and the case classification is reduced to two cases from four cases by using one variable Z as a parameter. In addition, control performance is equal even if a determination parameter is changed.

Additionally, in the invention, in all the cases, a control current becomes always zero in one of magnetic pole coils which face each other, and further reduction in consumed current and further loss reduction are attained.

Additionally, the number of determination required is half-reduced in every period of digital operation, so that control logic can be simplified and the operation load of CPU can be significantly reduced. That is, it becomes possible to contribute to shortening of cycle time, and simultaneously, reduce the specification required for CPU.

DESCRIPTION OF THE PREFERRED EMBODIMENT

The invention simplifies control logic, reduces a control current, and reduces a CPU operation load while exhibiting control capability equivalent to Patent Document 2 that is prior application by the inventors of the invention. Hereinafter, the invention will be described comparing with this conventional technique.

Figure 1:
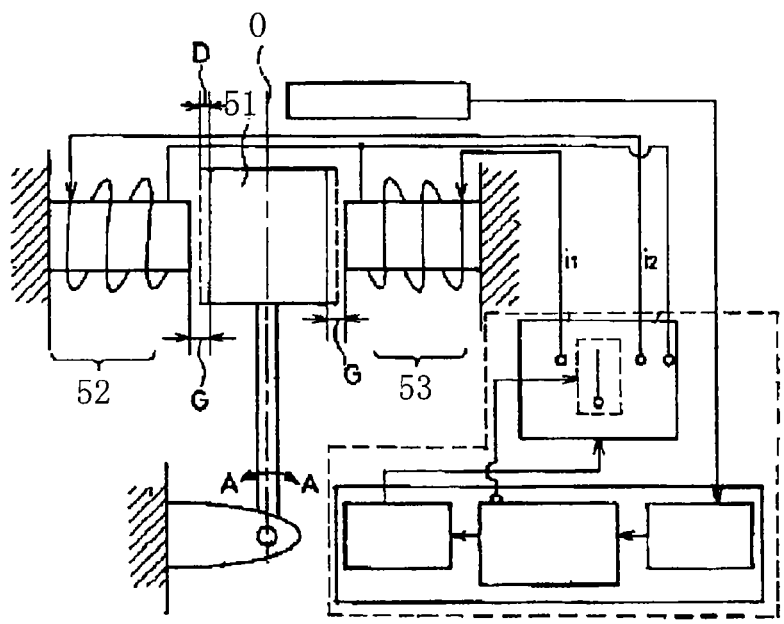
FIG. 1 is a schematic view of an "active control electromagnetic attraction type magnetic bearing" of Patent Document 1.
Figure 2:
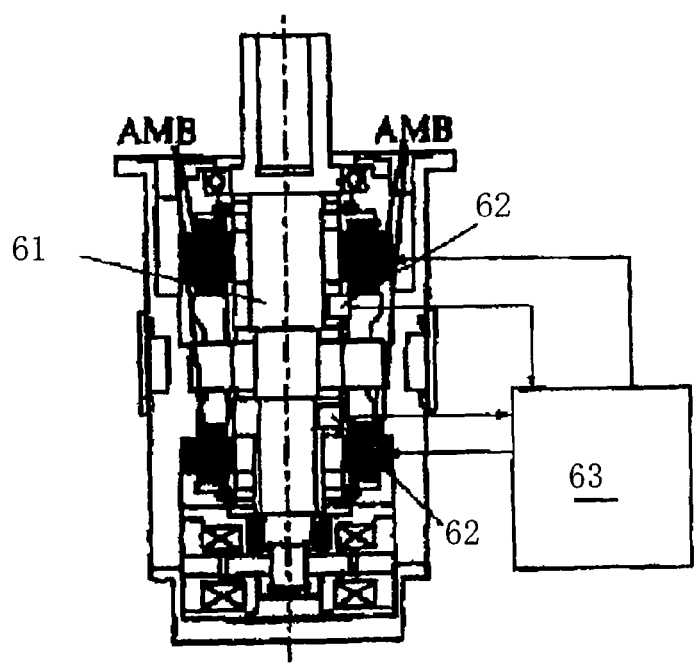
FIG. 2 is a schematic view of "the electromagnetic attraction type magnetic bearing and its nonlinear control method" of Patent Document 2.
Figure 3:
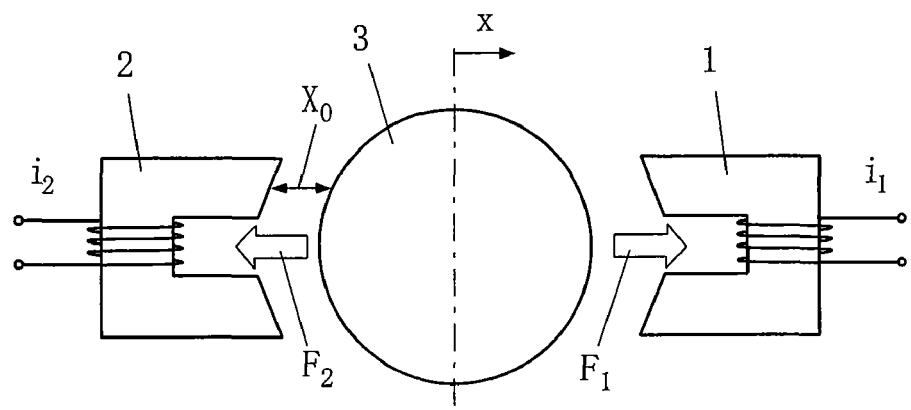
FIG. 3 is a control model diagram of a conventional electromagnetic attraction type magnetic bearing.

FIG. 3 is a control model diagram of a conventional electromagnetic attraction type magnetic bearing. The electromagnetic attraction type magnetic bearing includes at least a pair of electromagnets 1 and 2 (a first electromagnet 1 and a second electromagnet 2) arranged to face each other, a float 3 arranged between the electromagnets 1 and 2 and held at the middle position thereof, and a sensor (not shown) which detects the displacement x of the float 3 from a balance position, and/or the speed v (=dx/dt) thereof.

In addition, in the following description, M is a rotor mass [kg], $X_0$ is a magnetic gap [m], x is displacement [m] directed to the first electromagnet 1 from a balance point, $i_1$ is the control current [A] of the first electromagnet 1, $i_2$ is the control current [A] of the electromagnet 2, $F_1$ is the attraction force [N] of the first electromagnet 1, $F_2$ is the attraction force [N] of the electromagnet 2, $\mu_0$ is a space permeability (=$4\pi \times 10^7$) [H/m], S is a magnetic path cross-sectional area [m²], N is the number [–] of coil turns of electromagnets 1 and 2, and k is a magnetic attraction force coefficient (=$\mu_0 N^2 S/4$ [m⁴]).

In this case, equation of motion becomes as Equation (1) of Expression 1. In addition, in the following expression, v=dx/dt is expressed by x over which one dot is given, and acceleration $d^2x/dt^2$ is expressed by x over which two dots are given.

[Expression 1]

$$M\ddot{x} = F_1 - F_2 = k\left(\frac{i_1}{X_0 - x}\right)^2 - k\left(\frac{i_2}{X_0 + x}\right)^2 \quad (1)$$

In the conventional control, classification into four cases is made depending on the positive and negative values of the rotor displacement x and the speed v, and the control currents $i_1$ and $i_2$ are determined. The control currents in the respective cases and results after the control currents are assigned to Equation (1) are shown in Equation (2.1) to Equation (2.4) of Expression 2.

Here, a is a constant which exceeds 1, γ is a positive constant, and these can be arbitrarily determined.

[Expression 2]

$$\text{Case-1} \quad x \geq 0, \dot{x} \geq 0 \quad (2.1)$$
$$i_1 = 0$$
$$i_2 = a(X_0 + x)\sqrt{\frac{x + \gamma\dot{x}}{k}}$$
$$M\ddot{x} = F_1 - F_2 = -(a^2 x + a^2 \gamma \dot{x})$$

-continued

Case-2  $x \geq 0, \dot{x} < 0$  (2.2)

$$i_1 = a(X_0 - x)\sqrt{-\frac{\gamma\dot{x}}{k}}$$
$$i_2 = a(X_0 + x)\sqrt{\frac{x}{k}}$$
$$M\ddot{x} = F_1 - F_2 = -(a^2 x + a^2 \gamma \dot{x})$$

Case-3  $x < 0, \dot{x} < 0$  (2.3)

$$i_1 = a(X_0 - x)\sqrt{-\frac{x + \gamma\dot{x}}{k}}$$
$$i_2 = 0$$
$$M\ddot{x} = F_1 - F_2 = -(a^2 x + a^2 \gamma \dot{x})$$

Case-4  $x < 0, \dot{x} \geq 0$  (2.4)

$$i_1 = a(X_0 - x)\sqrt{-\frac{x}{k}}$$
$$i_2 = a(X_0 + x)\sqrt{\frac{\gamma\dot{x}}{k}}$$
$$M\ddot{x} = F_1 - F_2 = -(a^2 x + a^2 \gamma \dot{x})$$

The following things can be seen from the respective equations of Expression 2.

(1) In Case-2 and Case-4, a current flows into both the control current $i_1$ of the first electromagnet 1 and the control current $i_2$ of the second electromagnet 2 in order to give damping.

(2) In all the cases, $Md^2x/dt^2$ becomes the same result. Here, if $K=a^2$ and $C=a^2\gamma$ ... (3), Equation (1) becomes Equation (4), and an equation of motion of one degree-of-freedom vibration system having damping is obtained.

$$Md^2x/dt^2 = -Cdx/dt - Kx \quad (4)$$

In other words, a control force necessarily becomes $-Cdx/dt-Kx$. It can be seen from this that the constants a and $\gamma$ are uniquely determined by determining the characteristic value $\omega$ and damping ratio $\zeta$ of the one degree-of-freedom vibration system.

(3) In Case-1 and Case-3, the direction of the control force is always constant without depending on x and dx/dt. However, in Case-2 and Case-4, the direction of the control force changes depending on the relationship of x and dx/dt.

As described above, in the conventional Case-2 and Case-4, the control currents $i_1$ and $i_2$ will pass through two magnetic pole coils which face each other. The invention provides a means which makes one of the control currents completely zero, without impairing control performance.

Figure 4:
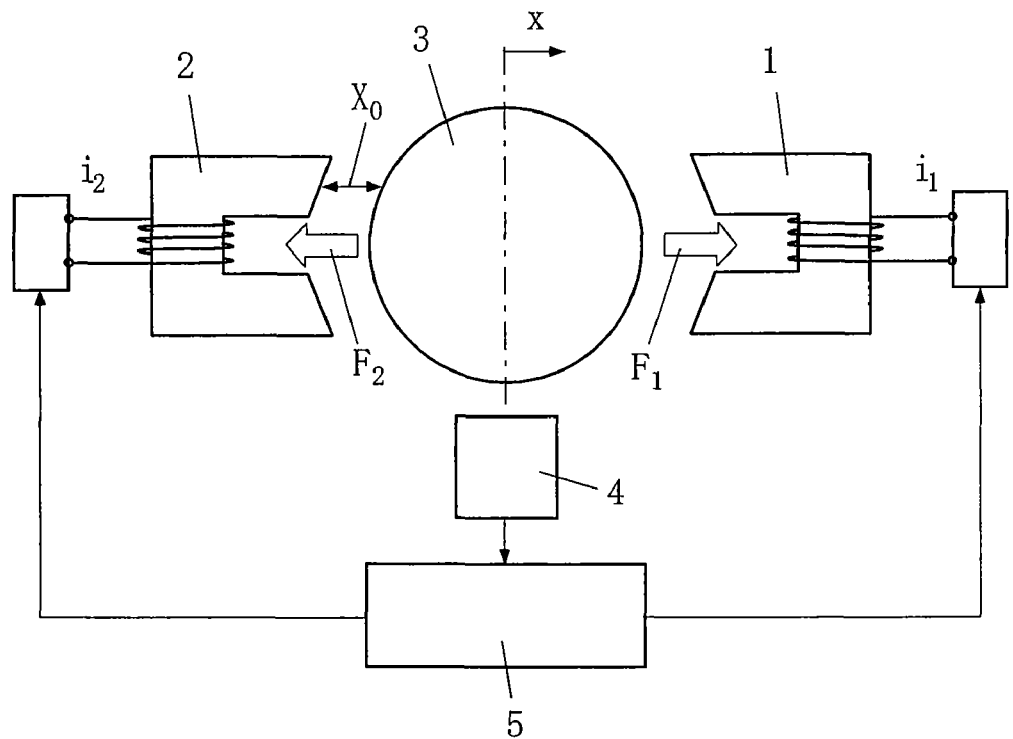
FIG. 4 is a control model diagram of the electromagnetic attraction type magnetic bearing according to the invention.

FIG. 4 is a control model diagram of the electromagnetic attraction type magnetic bearing according to the present invention.

The electromagnetic attraction type magnetic bearing of the invention includes at least a pair of electromagnets 1 and 2, a float 3, a sensor 4, and a controller 5.

The pair of electromagnets 1 and 2 is composed of the first electromagnet 1 and the second electromagnet 2, and is arranged to face each other.

The float 3 is arranged between the electromagnets 1 and 2, and held at the middle position thereof. In this example the float 3 shall be, for example, a shaft which rotates around an axis in a vertical direction, shall be supported in a horizontal direction in the drawing by a magnetic bearing, and shall not be influenced in the direction of gravity. In addition, supporting in the vertical direction in the drawing shall be performed by the other magnetic bearing, and similarly, shall not be influenced in the direction of gravity.

In addition, in a case where a shaft is influenced by gravity like a case where the shaft is horizontally supported, the shaft can be similarly treated by applying (adding or subtracting) gravity to the attraction force of an electromagnet.

The sensor 4 detects the displacement x of the float 3 from a balance position, and/or the speed v (=dx/dt) thereof. Preferably, the sensor 4 is a noncontact type sensor. Additionally, although this sensor may be either a displacement sensor or a speed sensor, it may include both sensors. In addition, when only the displacement x is detected, the displacement is differentiated to determine the speed v, and when only the speed v is detected, the speed is integrated to determine the displacement x.

The controller 5 determines a variable Z proportional to acceleration in the control direction from the displacement x and speed v of the float. And the controller 5 operates to set the control current of one of the electromagnets to zero and to control only the control current of other of electromagnets, depending on the positive and negative values of the variable. That is, the controller 5 calculates the currents $i_1$ and $i_2$ to be supplied to the electromagnets 1 and 2 in real time according to an equation to be mentioned later, and controls the electromagnets 1 and 2.

In the conventional means, case classification is carried out by performing determination in positive and negative values of the displacement and speed of the float. However, in the invention, the variable Z proportional to acceleration in the control direction is introduced as a new determination item.

Here, the variable Z is given by the following Equation (5).

$$Z = x + \gamma v \quad (5)$$

Table 1 shows comparing the invention will be with a conventional example. As shown in this table, although natural, the positive and negative values of the variable Z becomes necessarily opposite to the direction of a control force to be generated.

TABLE 1

| Case | DISPLACEMENT | SPEED | Z | DIRECTION OF CONTROL FORCE | ENERGIZATION COIL (CONVENTIONAL ART) | ENERGIZATION COIL (PRESENT INVENTION) |
|---|---|---|---|---|---|---|
| Case-1 | $x \geq 0$ | $\dot{x} \geq 0$ | POSITIVE | NEGATIVE | MAGNETIC POLE 2 | MAGNETIC POLE 2 |
| Case-2 | $x \geq 0$ | $\dot{x} < 0$ | POSITIVE | NEGATIVE | MAGNETIC POLES 1 AND 2 | MAGNETIC POLE 2 |
|  |  |  | NEGATIVE | POSITIVE | MAGNETIC POLES 1 AND 2 | MAGNETIC POLE 1 |
| Case-3 | $x < 0$ | $\dot{x} < 0$ | NEGATIVE | POSITIVE | MAGNETIC POLE 1 | MAGNETIC POLE 1 |
| Case-4 | $x < 0$ | $\dot{x} \geq 0$ | NEGATIVE | POSITIVE | MAGNETIC POLES 1 AND 2 | MAGNETIC POLE 1 |
|  |  |  | POSITIVE | NEGATIVE | MAGNETIC POLES 1 AND 2 | MAGNETIC POLE 2 |

From these, in the invention, the currents $i_1$ and $i_2$ are determined as follows.

(1) Since one of the currents necessarily becomes zero in Case-1 and Case-3, the control currents $i_1$ and $i_2$ are set to the same currents as the conventional control.

(2) In Case-2 and Case-4, the direction of a control force can become either positive or negative direction depending on the positive and negative values of the variable Z in the conventional control. Consequently, depending on the positive and negative values of the variable Z, one electromagnet to which a current is to be applied is determined, and application of a current to an electromagnet opposite to the direction of a control force is set to zero.

(3) Attention is paid to the variable Z newly introduced for determination instead of two parameters of displacement and speed, and as shown in Equation (6.1) and Equation (6.2) of Expression 3, current values are determined.

[Expression 3]

$$\text{Case-A} \quad a^2 x + a^2 \gamma \dot{x} \geq 0 \quad (6.1)$$

$$\left. \begin{array}{l} i_1 = 0 \\ i_2 = a(X_0 + x)\sqrt{\dfrac{x + \gamma \dot{x}}{k}} \\ M\ddot{x} = F_1 - F_2 = -(a^2 x + a^2 \gamma \dot{x}) \end{array} \right]$$

$$\text{Case-B} \quad a^2 x + a^2 \gamma \dot{x} < 0 \quad (6.2)$$

$$\left. \begin{array}{l} i_1 = a(X_0 + x)\sqrt{-\dfrac{x + \gamma \dot{x}}{k}} \\ i_2 = 0 \\ M\ddot{x} = F_1 - F_2 = -(a^2 x + a^2 \gamma \dot{x}) \end{array} \right]$$

In the respective equations of Expression 3, Case-1 and Case-3 are the same as the conventional ones.

Additionally, even in Case-2 and Case-4, application of a current to one electromagnet becomes zero, and a current is applied to only one of the electromagnets.

Along with Case-A and Case-B, the control force becomes $Md^2x/dt^2 = -Cdx/dt - Kx$ ... (4) similarly to the conventional technique, and becomes equivalent to the one degree-of-freedom vibration system having damping.

As described above, in the invention, a determination parameter is reduced to the variable Z from the displacement and the speed, and only determination of the positive and negative values of one parameter is performed.

Additionally, in all the cases, a current sent to one of electromagnets is necessarily set to zero.

Accordingly, since reducing a control current leads to a reduction in loss, it becomes possible to simplify control logic to reduce an operation load in CPU.

In addition, the control performance is equal irrespective of simplifying the control logic and reducing the control current.

In addition, it is natural that the invention is not limited to the above-described embodiment, but various modifications may be made without departing from the spirit and scope of the invention.

The invention claimed is:

1. An electromagnetic attraction type magnetic bearing comprising:
    (a) at least a pair of electromagnets arranged to face each other;
    (b) a float arranged between the electromagnets and held at the middle position thereof;
    (c) a sensor for detecting a displacement of the float from a balance position, or a speed of the float, or the displacement of the float from the balance position and the speed of the float; and
    (d) a controller for controlling the electromagnets, wherein the pair of electromagnets comprises a first electromagnet and a second electromagnet, and when displacement directed to the first electromagnet from the balance position of the float is defined as x, the speed v of the float is defined as v=dx/dt, and γ is defined as a positive constant, and
    wherein the controller determines a variable Z proportional to acceleration in the control direction based on the displacement and the speed of the float by the following Equation (A), $$Z = x + \gamma v \quad (A),$$

and the controller operates to set a control current of one electromagnet of the pair of the electromagnets to zero and to control only a control current of the other electromagnet of the pair of the electromagnets, depending on positive and negative values of the variable Z in cases including wherein
    (i) x≧0, v≧0;
    (ii) x≧0, v<0;
    (iii) x<0, v<0; and
    (iv) x<0, v≧0.

2. A control method of an electromagnetic attraction type magnetic bearing that holds a float arranged at a middle position between a pair of electromagnets arranged to face each other by at least the pair of electromagnets, wherein the pair of electromagnets comprises a first electromagnet and a second electromagnet, and when displacement directed to the first electromagnet from the balance position of the float is defined as x, the speed v of the float is defined as v=dx/dt, and γ is defined as a positive constant, the control method comprising the steps of:
    (a) detecting the displacement of the float from a balance position, or a speed of the float, or the displacement of the float from the balance position and the speed of the float;
    (b) determining a variable Z proportional to acceleration in the control direction from the displacement and the speed of the float by the following Equation (A), $$Z = x + \gamma v \quad (A);$$

and
    (c) operating a controller to set the control current of one electromagnet of the pair of the electromagnets to zero and to control only a control current of one electromagnet of the pair of the electromagnets, depending on positive and negative values of the variable Z in cases including wherein
    (i) x≧0, v≧0;
    (ii) x≧0, v<0;
    (iii) x<0, v<0; and
    (iv) x<0, v≧0.

3. The control method of an electromagnetic attraction type magnetic bearing according to claim 2,
    wherein, when a is defined as a constant exceeding 1, $X_0$ is defined as a magnetic gap of the balance position, and the variable Z is positive or zero, the control current of the first electromagnet is set to zero, and the control current $i_2$ of the second electromagnet is determined by the following equation (B):

$$i_2 = a(X_0 + x)\text{SQRT}(Z/k) \quad (B), \text{ and}$$

when the variable Z is negative, the control current of the second electromagnet is set to zero, and the control current $i_1$ of the first electromagnet is determined by the following equation (C):

$$i_1 = a(X_0 - x)\text{SQRT}(-Z/k) \quad (C).$$

* * * * *